United States Patent
V et al.

(10) Patent No.: US 10,552,305 B2
(45) Date of Patent: Feb. 4, 2020

(54) CUSTOM UPGRADE TESTING SYSTEM

(71) Applicant: SAP SE, Walldorf (DE)

(72) Inventors: Karthikeyan V, Bangalore (IN); Prakash Kumar, Bangalore (IN); Ravi Kanth Malipeddu, Bangalore (IN)

(73) Assignee: SAP SE, Walldorf (DE)

( * ) Notice: Subject to any disclaimer, the term of this patent is extended or adjusted under 35 U.S.C. 154(b) by 38 days.

(21) Appl. No.: 15/838,395

(22) Filed: Dec. 12, 2017

(65) Prior Publication Data
US 2019/0179731 A1   Jun. 13, 2019

(51) Int. Cl.
*G06F 9/44* (2018.01)
*G06F 11/36* (2006.01)
*G06F 8/65* (2018.01)

(52) U.S. Cl.
CPC ...... *G06F 11/3684* (2013.01); *G06F 11/3688* (2013.01); *G06F 11/3692* (2013.01); *G06F 8/65* (2013.01)

(58) Field of Classification Search
CPC ............... G06F 11/368; G06F 11/3688; G06F 11/3664; G06F 11/3684; G06F 11/3668; G06F 11/3672; G06F 11/3692; G06F 11/261; G06F 8/60; G06F 8/71
See application file for complete search history.

(56) References Cited

U.S. PATENT DOCUMENTS

| | | | | |
|---|---|---|---|---|
| 8,910,294 | B1* | 12/2014 | Sennett | H04L 63/1433 726/25 |
| 9,152,386 | B1* | 10/2015 | Rojas | G06F 8/65 |
| 9,417,994 | B2* | 8/2016 | Ellis | G06F 11/3684 |
| 2005/0166094 | A1* | 7/2005 | Blackwell | G06F 11/3664 714/38.14 |
| 2009/0249284 | A1* | 10/2009 | Antosz | G06F 8/10 717/104 |
| 2013/0152047 | A1* | 6/2013 | Moorthi | G06F 11/368 717/124 |
| 2013/0174117 | A1* | 7/2013 | Watters | G06F 11/3664 717/106 |
| 2014/0215439 | A1* | 7/2014 | Krishnan | G06F 11/3688 717/124 |
| 2016/0306735 | A1* | 10/2016 | Adderly | G06F 11/3664 |
| 2017/0091069 | A1* | 3/2017 | Fujiwara | G06F 8/65 |

* cited by examiner

*Primary Examiner* — Duy Khuong T Nguyen
(74) *Attorney, Agent, or Firm* — Fish & Richardson P.C.

(57) ABSTRACT

Upgrade is provided to a cloud application in a cloud environment of a customer. A task list for an upgrade testing for the cloud application is automatically triggered at a test cloud infrastructure. Execution processes of the cloud application are listed. Available test scripts for the processes are defined. Iterations over the test scripts are performed to determine relationships between scripts and processes. The iterations over the test scripts may be executed by a data mapping logic. For a process from the list, a corresponding test script and relevant data for the test script from a database of the cloud application are determined. The relevant data and actions from the test script are mapped. A test data variant is generated for execution based on the relevant data and actions of the test script. The test results are collected and analyzed.

20 Claims, 6 Drawing Sheets

Create Sales Order 410

Actions

| Action ID 420 | Optional Action 430 | Action Type 440 | Label 450 | Value 460 |
|---|---|---|---|---|
| 1 | O NO | Enter Application | SalesDocumet-create | |
| 2 | O NO | Input | Sales Document Type | CBFD |
| 3 | O NO | Input | Sales Organization | 1010 |
| 4 | O NO | Input | Distribution Channel | 10 |
| 5 | O NO | Input | Division | 00 |
| 6 | O NO | Keystroke | Enter | |
| 7 | O NO | Input | Sold-To Party | 10100001 |
| 8 | O NO | Input | Customer Reference | Reference for Sales Order Creation |
| 9 | O NO | Keystroke | Enter | |
| 10 | O NO | Input | Order Reason (Reason for the Business Transaction) | Free of charge Sample |
| 11 | O NO | Input Data in Field: 1 | Item | 1 |
| 12 | O NO | Input Data in Field: 1 | Material | TG11 |

FIG. 4

CUSTOM UPGRADE TESTING SYSTEM

BACKGROUND

Software systems undergo different stages in their release cycles including design, development, testing, etc. During the testing phase, resolution of identified issues is performed, where disruption of regular processes is to be avoided. Software systems provide instant value and high return on investment to software customers. Software vendors try to provide software services with 100% availability (zero-down time) and uninterrupted support (24×7 support).

Cloud delivery of software may have faster release cycles and issue correction cycles. In such cases, the time span available for testing the software after upgrade or update to a new cloud release may shrink and require testing to be part of continuous integration. Software vendor performs testing with quality commitment, considering the complexity involved with software's various configurations, integration with multiple use cases, country specific localizations, etc.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with their advantages, may be best understood from the following detailed description taken in conjunction with the accompanying drawings.

FIG. 4 is an exemplary process step definition to be automatically executed on an application, in one embodiment.

DETAILED DESCRIPTION

Embodiments of techniques for custom upgrade testing system are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

To achieve continuous deployment in a cloud solution environment and a quicker resolution of identified issues through faster adoption of innovations, a process for testing on a continuous basis may be established. While software vendors perform testing of the provided functionality of software solutions, it is recommended that customers also perform a test for end-to-end execution scenarios with actual data and configurations. Considering these requirements and involved complexities, a test tool may be provided along with pre-defined standard automated test scripts.

Figure 1:
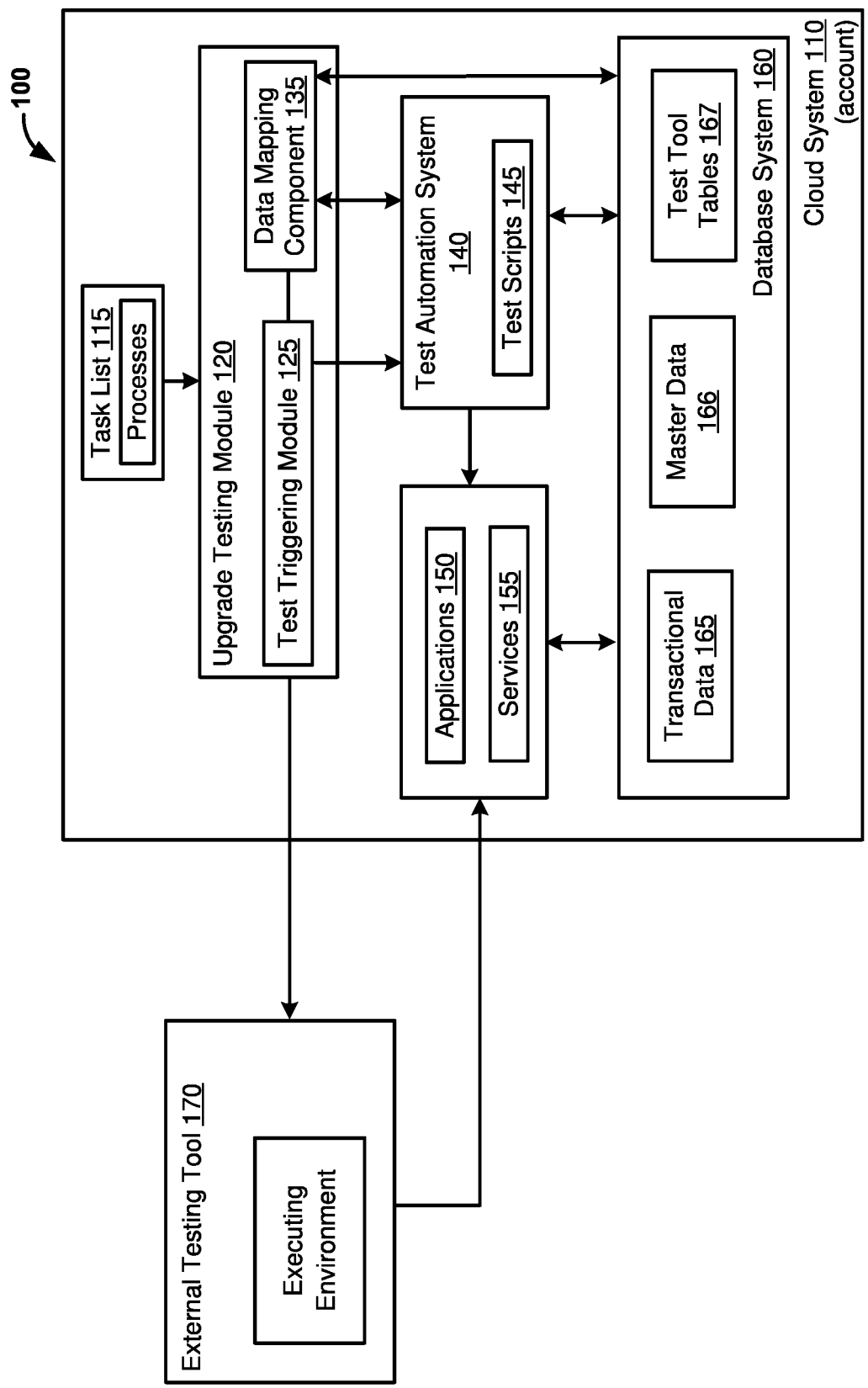
FIG. 1 is a block diagram illustrating an exemplary environment of a custom upgrade testing system, according to one embodiment.

FIG. 1 is a block diagram illustrating an exemplary environment 100 of a custom upgrade testing system, according to one embodiment. A cloud system 110 is provided to include an upgrade testing module 120. The cloud system 110 includes applications 150 and services 155, which are upgraded within the environment 100. The applications 150 and the services 155 are targeted for upgrade testing through the upgrade testing module 120.

The upgrade testing module 120 is in connection with a test automation system 140. The test automation system 140 includes implemented logic for automated test execution based on defined test scripts 145. The test automation system 140 is in communication with the applications 150 and the services 155, when an upgrade test is triggered. The test automation system 140 may trigger a test execution on a relevant deployed application under testing.

In one embodiment, the test automated scripts at the test scripts 145 correspond to end-to-end processes associated with applications from the applications 150, which are to be tested.

Software providers or vendors of the applications 150 and services 155 may provide upgrades for the applications and services. The applications 150 and services 155 may be deployed in a cloud environment, where cloud system 110 may represent a quality landscape account for performing testing. An application from the applications 150 may be deployed within a cloud environment, and respectably on the cloud system 110. Different customizations and configurations may be applied within the account of the customer deploying the application. Therefore, a specific customer version of the application is running in a cloud environment, where the application includes logic provided by the software vendor and customizations and configurations made on top of the provided application version. A software vendor may provide different software application versions to different customers, where different sets of functionality are activated for different customers and available for applications' users.

In one embodiment, software vendors may provide upgrades to the cloud accounts, where applications and application services are deployed and running. An upgrade may be provided to the cloud environment, where the upgrade may be associated with one or more of the applications 150. The upgrade may be also associated with one or more of the services 155. After an upgrade is performed on an application or an application service, the application customizing and configuration as defined for the cloud customer may be maintained and/or re-applied over the upgrade version of the application or application service. The maintenance of the customizations and configurations may be provided by a software/service provider.

Once the configurations and customizations are performed, an automated upgrade test for the upgraded version of the application or application service may be triggered through the upgrade testing module 120 within the cloud system 110 as a cloud testing environment. Within the cloud system 110, the application is upgraded and configurations and customizations are applied on top of the upgraded version. Therefore, the upgraded application is running in the cloud environment and may be tested through the upgrade testing module 120.

In one embodiment, the upgrade testing triggered by the upgrade testing module 120 at the cloud system 110 with regards to the upgraded version of the application (or service) may be performed over customer data stored during execution of the application while in a previous (non-upgraded) version. Further, the upgrade testing may be performed based on delivered standard test scripts, for example by testing solution providers and/or the software vendors of the application. This can be achieved by automatically triggering a task list 115 in the cloud system 110 tenant. When the task list 115 is triggered, a selection of an upgrade test for a process associated with the upgraded version of the application in initiated. The task list 115 includes data for a number of processes associated with the applications 150 and the services 155. A process within the scope of the processes in the task list 115 define an order of actions that are to be executed on a running application, where actions may be associated with providing user input, performing user interface (UI) selections, and other interactions with the application. A set of processes may be associated with a single application, where these processes are related to provided functionality implemented by that single application.

In one embodiment, a process from the task list 115 is selected to be associated with the upgraded version of the application that is to be tested. The process is determined through the upgrade testing module 120 to be associated with relevant test scripts defined at test scripts 145 at test automation system 140. The upgrade testing module 120 includes a test triggering module 125, which communicates the defined process with the test automation system 140 to determine the test scripts in the scope of the defined process.

Once the process is defined, an analysis over process steps of the process may be performed. For each process step (action to be executed on the application), application data to be used for the testing is read from a database of application. The database of the application stored data related to the execution of processes by different end users during productive mode. Such productive data from real scenarios may be used for the testing of the upgraded application within the cloud system 110 environment. A database system 160 is associated with the applications 150 and services 155. The database system 160 may store data relevant for the applications 150 and services 155, which include transactional data 165 and master data 166. Further, the database system 160 may store further database tables such as test tool tables 167, which are associated with test executions triggered by the upgrade testing module 120.

The upgrade testing module 120 may establish a relation between a process script and the data available in cloud system 110 tenant. The data associated with the application, which is to be used during testing, may be generated at a different system, compared to the cloud system 110. For example, the data may be generated at a productive landscape where the application with its previous non-upgraded version was running. Once the data is generated and the application is to be upgraded, such data may be transferred from the productive landscape to the cloud system 110, which acts as a quality landscape.

In one embodiment, the upgrade testing module 120 includes also data mapping component 135. The data mapping component 135 is in communication with the test triggering module 125. The data mapping component 135 receives information about the process that is defined for the testing, the relevant upgraded version of the application, and relevant test scripts from the test scripts 145. The data mapping component 135 includes implemented functionality to communicate with the database system 160 and to read application related data and to perform mapping of application related data with a test script. The data mapping component 135 may read data such as transactional data, master data, and organizational data associated with the application under testing.

In one embodiment, the data mapping component 135 performs mapping of data stored in relation to the application under testing and a relevant test script for the defined process. The mapping operations performed by the data mapping component 135 include definition of appropriate operations that are to be executed over the data. For example, such operations include selections, joins, other conditioning statements, etc.

In one embodiment, the test execution with regards to upgrade testing for applications 150 and services 155 may be performed within the cloud system 110. The cloud system 110 is a testing cloud environment, which may be maintained by software providers of the applications 150 and services 155. Therefore, the testing is executed separately from the productive landscape of the customer of applications and services.

In some embodiments, the cloud system 110 may be associated with an external testing tool 170. The external testing tool 170 is a software testing system for execution of tests over deployed cloud applications. The external testing tool 170 may be remote from the cloud system, and may provide logic for triggering upgrade tests within the execution environment, where upgraded applications for testing are running. The external testing tool 170 may be in connection with the upgrade testing module 120, which may provide data relevant for test execution within the external execution environment.

Figure 2:
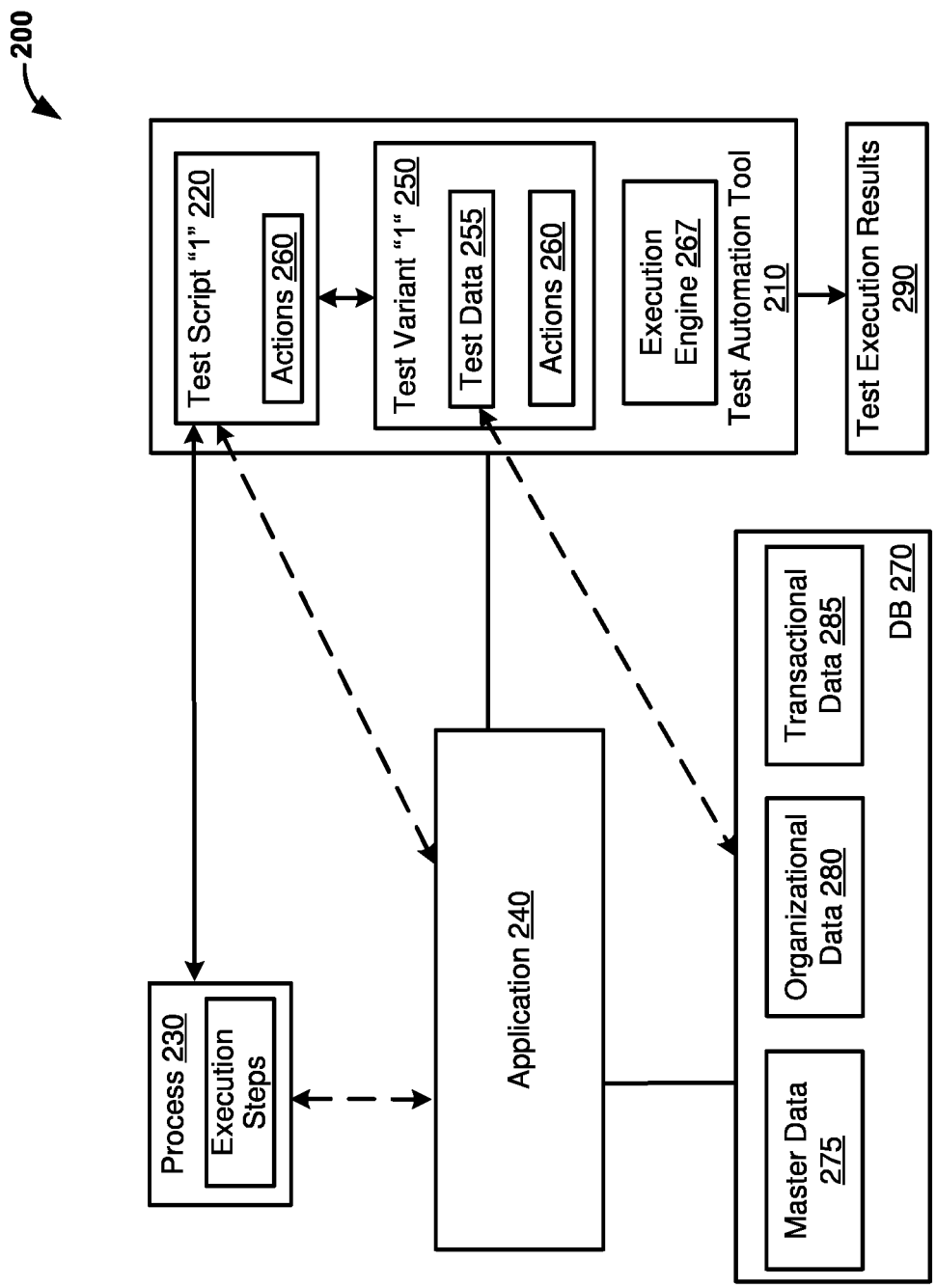
FIG. 2 is a block diagram illustrating an exemplary test environment for executing pre-defined test scripts over applications and applications' data, according to one embodiment.

FIG. 2 is a block diagram illustrating an exemplary test environment 200 for executing pre-defined test scripts over applications and applications' data, according to one embodiment.

In one embodiment, an application 240 is deployed and running in a cloud environment. The application 240 may be such as one of the applications 150, FIG. 1. The application 240 is provided to be running within a customer environment (landscape), where customer specific customizations are defined. The application 240 is provided by a software vendor as an upgraded version of a previous version of the application 240, which was also integrated within the customer landscape. The application 240 is targeted for upgrade testing within the exemplary test environment 200.

In one embodiment, a process 230 including a number of execution steps is associated with the application 240. For example, the application 240 may be an Enterprise Resource Planning (ERP) solution and the process 230 may be for a process for free of charge delivery. The process may be defined to include several steps, or sub-processes which include creation of a sales order of a certain type that is not billing relevant. The order may be confirmed based on the availability of goods. A delivery is created. The goods are then picked, confirmed, and delivered to the customer. The process is implemented within application 240 and may be configured with customized parameters to correspond to customer requirements. The process includes specific steps/actions to be executed at a running instance of the application 240. The application 240 may be custom configured, and configuration data including custom configurations may be stored at a database associated with the application 240. For example, the custom configuration metadata may be stored at a master data database, such as at master data 275.

FIG. 4 shows an exemplary view of a sales order creation step and relevant user actions for performing the process step. When a test is to be executed in relation to that process, a test automate may be created, which is executable. The test automate may create defined user actions and provide associated input.

In one embodiment, a test automation tool 210 is provided, which includes test scripts defined in relation to cloud applications, including the application 240. A test script "1" 220 is determined to be associated with process 230. The process 230 is to be executed on an upgraded version of the application 240, and the test script "1" 220 is defined based on testing the upgraded version, which may have differences in the functional behavior, visualization, and UI interaction.

The test script "1" 220 includes actions 260 that are defined in relation to the application 240. For example, an action from the actions 260 may defines a particular user interaction with UI of the application 240, where a test value is provided to determine the behavior of the application 240 under the test conditions defined for the test script "1" 220.

The test script "1" 220 includes actions that correspond to the definition of the process 230. The test automation tool 210 includes implemented logic to perform data mapping between the test script "1" 220 and relevant data for test execution related to the application 240. Therefore, data of the application 240, which is stored at database (DB) 270 is evaluated. Relevant data from the master data 275, organizational data 280, and transactional data 285 for the test execution based on test script 220 is extracted.

Based on the test script "1" 220 and the extracted relevant data for the test execution, a test variant "1" 250 is created. The test variant "1" 250 is a data variant including test data 255 and actions 260. The test data 255 is data of the application 240 that is relevant for the execution of process 230 and is real productively created data. The test data 255 is data not generated artificially for testing. The test data 255 is data that a customer of the application 240 may use when utilizing the application 240 as an upgraded version of a previously utilized version.

In one embodiment, the test data 255 may be determined based on data mapping logic, such as the data mapping logic described in relation to FIG. 1. The test data is determined based on evaluation of the relevant process 230 for testing, and the included execution steps. The execution steps are associated with actions 260 at the test script "1" 220. For an execution step, fields of database tables from DB 270 relevant for the execution step are determined and are mapped to user actions. In such manner, fields are mapped to required data entries, and thus the test variant "1" 250 is created as a test automate, which can be provided to an execution engine 267. The testing is performed and test execution results 290 may be provided by the test automation tool 210.

Determining of required data from database tables from the DB 270 may be performed through implemented logic at a data mapping component as part of the mapping logic. Data from different database tables may be retrieved based on different logical conditions and join logic, which is necessary for the process 230 under test.

Figure 3:
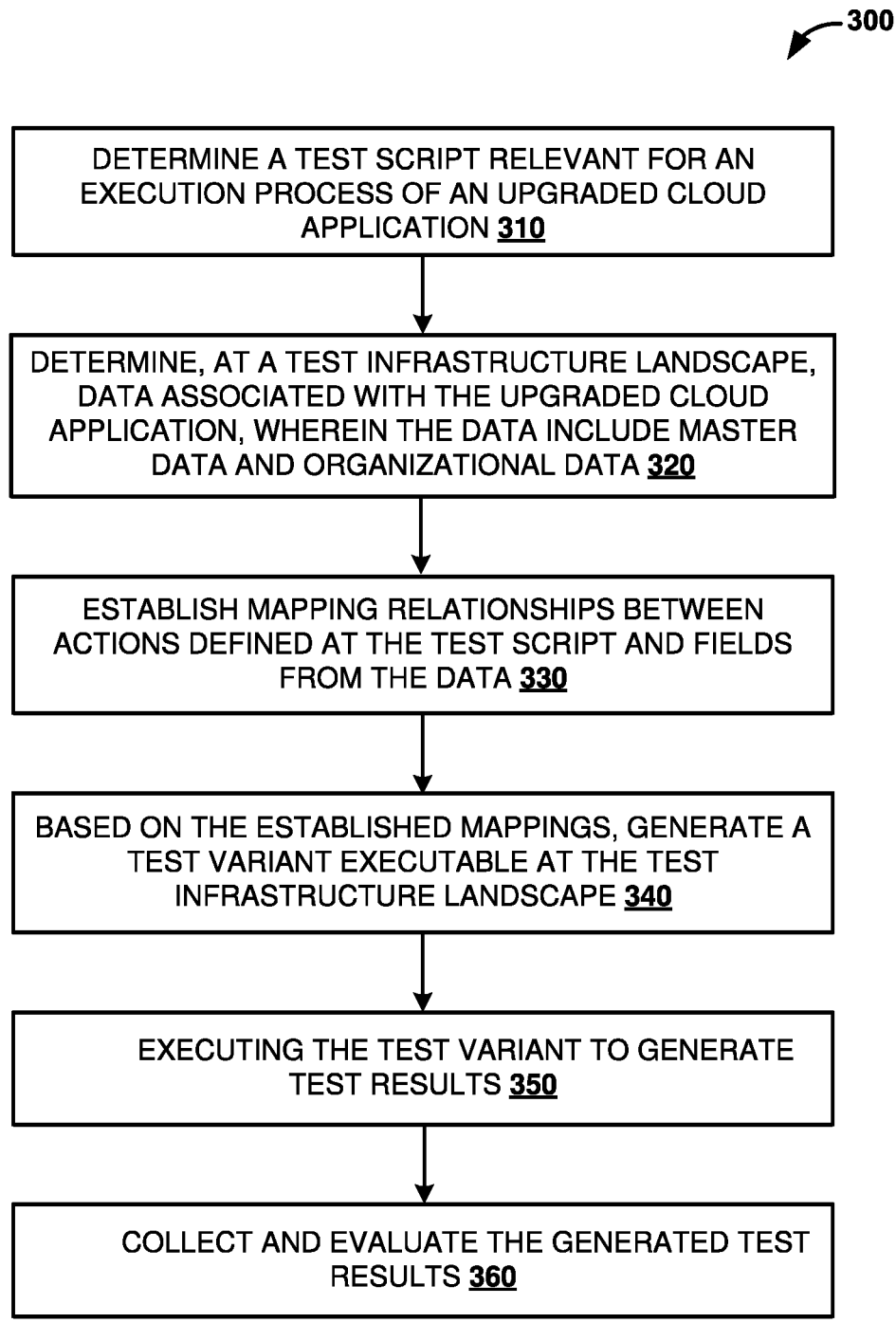
FIG. 3 is a flow diagram illustrating a process for performing a custom upgrade test, according to one embodiment.

FIG. 3 is a flow diagram illustrating a process 300 for performing a custom upgrade testing, according to one embodiment. The upgrade testing is performed at a cloud test infrastructure associated with a cloud application provided for a customer account. The cloud application is associated with customer specific configurations, which are relevant for the customer account, and may not be relevant for the same cloud application integrated in another cloud infrastructure for a different cloud account. Process 300 may be executed within a cloud environment and in relation to test automation tool, as discussed in relation to FIG. 1 and FIG. 2.

The cloud application is associated with one or more functions that may be defined as execution processes. An execution process may include a number of sub-processes and steps, that are associated with interactions with the cloud application. The interactions may require providing of input values. The execution of processes implemented at the cloud application is associated with storing data at a database related to the cloud application. The database may include master data and organizational data, where specific configurations for the applications are defined. Further, the database may include tables for storing transactional data.

In one embodiment, the cloud application is associated with an upgrade operation to generate an upgrade cloud application. The upgrade operation may be provided by a software vendor of the cloud application. The upgraded cloud application may be deployed and testing of the upgraded version may be performed. The testing may be performed based on the upgrade as provided by the software vendor. However, in such case, a second upgrade testing has to be performed within the customer cloud environment, where customer specific configurations are stored. Therefore, a test automation tool, such as the test automation tool 210, FIG. 2, may be utilized. An upgraded cloud application is tested within a test cloud infrastructure, where data specific for the customer is used during test execution. The specific data for the customer may be real data extracted from a customer's database associated with a previous version of the cloud application. The execution of process 300 may be within the scope of execution of a test execution tool such as the test automation tool 210, FIG. 2 and a cloud system environment, such as the cloud system 110, FIG. 1.

At 310, a test script relevant for an execution process of an upgraded cloud application is determined. The test script may be determined based on an evaluation of a set of test scripts that are provided by a software vendor of cloud applications. At 320, at a test infrastructure, data associated with the upgraded cloud application is determined. The data include master data and organizational data. At 330, mapping relationships between actions defined at the test script and fields from the data are established. At 340, based on the established mappings, a test variant executable at the test infrastructure landscape is generated. At 350, the test variant is executed at the test infrastructure to generate test results. At 360, test results are collected and analyzed.

In one example, master data included in master data 166, FIG. 1, or master data 275, FIG. 2 may include data associated with sales transactions performed in relation to different sales products. In particular, a particular material may be identified within the master data, and a sold-to party for that material, a document type of a sales document referring to the material, other. The master data may include data as presented at Table 1 and Table 2 below.

Organizational data may also be associated with the master data, for example such as organizational data 280, FIG. 2, which data may be related to identifying a sales organization performing the sale transaction of the material as identified in the master data, the distribution channel, division, etc. The organizational data may include data such as the data presented at Table 3 below.

Such data, both master and organization data is associated with executed sales transactions through the cloud application which is upgraded and about to be tested. The master data and organization data may be extracted from the cloud application in a customer environment and provided to the upgraded cloud application environment. The master data and organizational data may be mapped to different execution steps of a test script, such as the text script defined at 310.

TABLE 1

| Sales Doc. | Item | Material | Item Description | ... | ... |
|---|---|---|---|---|---|
| 102199 | 10 | TG12 | HAWA 12 | | |

TABLE 2

| Sales Doc. | Supplier | Phone | Sold-To | ... | Currency |
|---|---|---|---|---|---|
| 102199 | | | 10100001 | | EUR |

TABLE 3

| Sales Doc. | Created By | Doc. Date | Sales Document Type | SOrg. | DC | DV |
|---|---|---|---|---|---|---|
| 102199 | CB99800000 | | OR | 1010 | 10 | 00 |

The data as presented in the example at Table 1, Table 2 and Table 3 may be picked and provided to a test script, which is associated with the scenario of creating a sales document at the upgraded cloud application. Table 4 present exemplary action IDs part of the scenario and how labels from the test script are mapped to values depicted from the master and organization data. The data at Table 4 is a portion of a test script, which is mapped with data taken from the master and organizational data as presented in Table 1, 2, and 3. Table 4 is associated with a "Create Sales Order" process as defined at a particular cloud application to be upgraded.

TABLE 4

| Action ID | Action Type | Label | Value | Data Binding |
|---|---|---|---|---|
| 1 | Enter Application | Sales Document-create | SalesOrder-Create | |
| 2 | Input | Sales Document Type | OR | |
| 3 | Input | Sales Organization | 1010 | |
| 4 | Input | Distribution channel | 10 | |
| 5 | Input | Division | 00 | |
| 6 | Click | Continue | | |
| 7 | Input | Sold-to Party | 0010100001 | |
| ... | | | | |
| 11 | Input Data in Field: 1 | Material | TG12 | |
| ... | | | | |

Table 4 may further include data about binding of processes. Table 4 includes column denoted as "Data Binding". When there are multiple processes chained together to achieve an end-to-end scenario, "Data Binding" column may be used and filled in with data regarding associated processes to the Sales Order process. For example, when the "Create Sales Order" process is followed by a second process, such as a "Create Delivery" process, sales order number created at the first process "Create Sales Order" may be supplied to next process "Create Delivery" process. In such case, the data binding column for the "Create Sales Order" process may be utilized and provided with data in relation to providing the sales order number to the next process.

FIG. 4 is an exemplary process step definition table 400 to be automatically executed on an application, in one embodiment. The process step is "Create sales order" 410, and includes actions, which are related to interaction with an application, where the process step may be executed. In one embodiment, the "Create Sales Order" 410 step part of implemented application logic of a cloud application, such as application 240.

For the creation of a sales order, a number of actions are defined, which are presented in a table 400 representing a test variant to be executed automatically when performing an upgrade testing. In one embodiment, the test variant as described at 400 may be generated based on logic implemented in a test automation tool, such as the test automation tool 210. The test variant includes data from a test script defined for the process step "Create Sales Order" 410 mapped with data of the application associated with the process step. The mapped actions with data is defined in the table 400, where the data is extracted from database tables associated with the application under test.

The table 400 includes a number of columns—Action ID 420, Optional Action 430, Action Type 440, Label 450, Value 460. Action ID 420 column defined unique identification of actions included in the performance of the process step. Optional Action 430 column defined whether an action is optional for the process step or not. The action type 440 column defines a type of an action. The actions may be user interaction actions, which define operations to be performed with UI elements and/or input be provided in UI fields. Further, the actions may be associated with commands provided through peripheral hardware devices to a machine used for interaction with the application. The Label 450 column defines a name of the action and the value 460 column defines values that may be inputted to the application in relation to performing the corresponding action.

For example, row 470 defines an action with ID equal to 2, which is not an optional action, and is of type "Input". The action of row 470 is with "Sales Document Type" label and a corresponding value "CBFD". The value defined in this row is determined based on mappings of objects from the process step, namely an object/field associated with a sales document type, with a database field associated with a value of a type defining sales documents. In the current example, the value of a sales document type is equal to "CBFD". The value "CBFD" is inputted to the application to define that the type of document is sales document. Further definition of actions and corresponding values, as extracted from the databases of the application are presented on FIG. 4.

Figure 5:
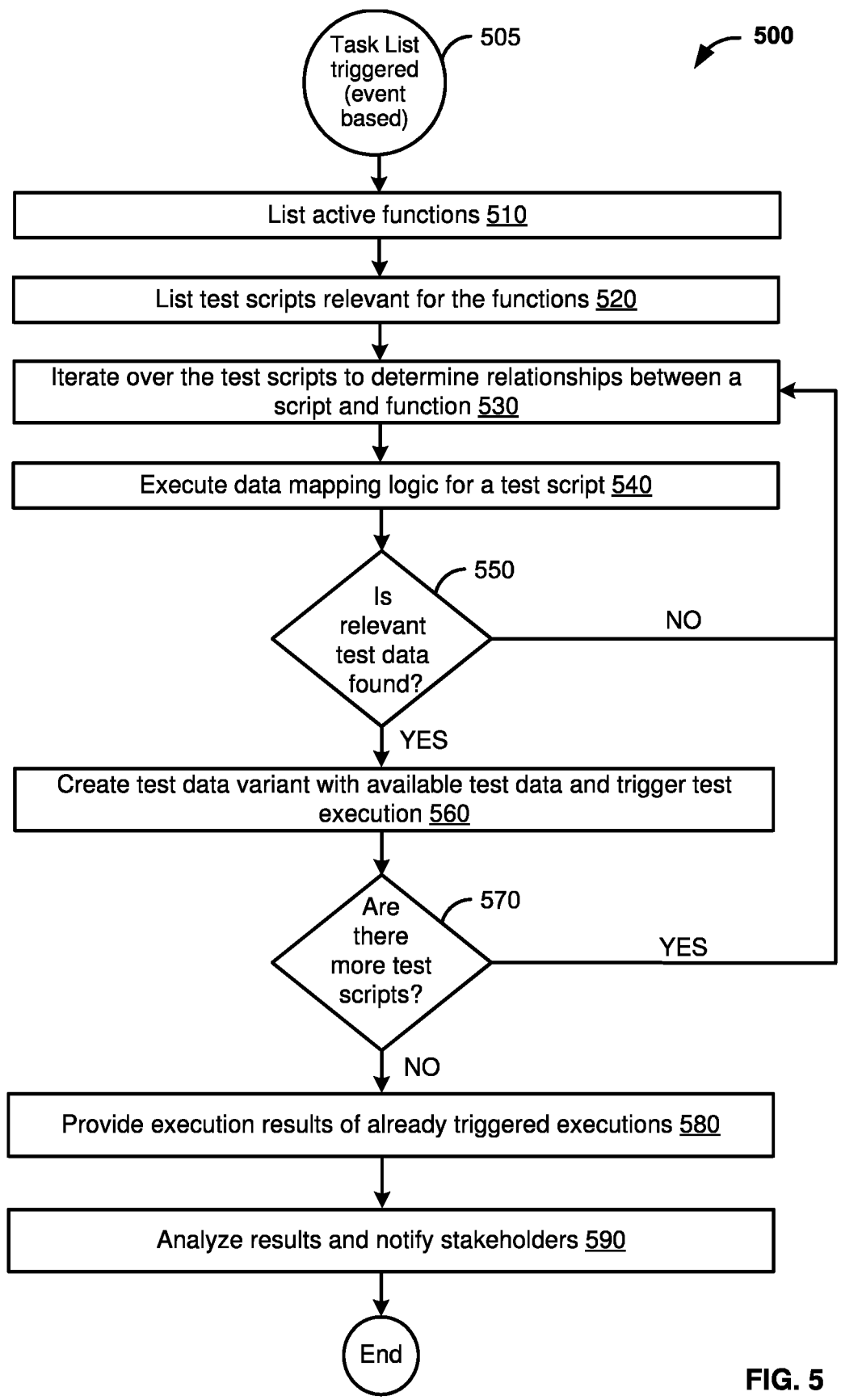
FIG. 5 is a block diagram illustrating a process for performing an upgrade test based on predefined test scripts executed over relevant test data, according to one embodiment.

FIG. 5 is a block diagram illustrating a process 500 for performing an upgrade test based on predefined test scripts executed over relevant test data, according to one embodiment.

When a cloud application is upgraded, quality testing activities may be performed to evaluate performed of the upgraded application. In customer scenarios, the cloud application is customized within the customer cloud environment to serve customer requirements (software and hardware). Therefore, a mere testing on the upgraded application may not cover all customer scenarios, and therefore the testing may not be sufficient. Therefore, a quality testing may be performed within a testing cloud environment, where access to customer application data is provided. The customer application data may include transactional data of the application, metadata such as master data and organizational data for the customer cloud account and application, etc. The upgraded application and the relevant customizations may be associated with a set of process executions. A process from the set is associated with a user execution scenario and defines actions to be performed over a running instance of the customized updated application.

In one embodiment, the process 500 may be executed within the environment described for the cloud system 110, FIG. 1. The process 500 is associated with triggering an automated test execution.

At 505, a task list for an upgrade test is triggered. The upgrade test is associated with processes associated with the upgraded application under testing. The cloud application may be such as the application 240, FIG. 2. The application is upgraded with regards to application functionality and customized after the upgrade according to customer requirements. To start the test execution over the upgraded application, at 510 active functions associated with the upgraded application are listed. The active functions may be execution processes, sub-processes, or execution steps relevant for the application.

At 520, available test scripts for the active functions are listed. The test scripts may be generated by the software vendor of the upgraded application or may be received from a test solution provider.

At 530, iterations over the test scripts listed are performed to determine relationships between scripts and functions. The iterations over the test scripts may be executed by a data mapping logic implemented an upgrade testing module, which may trigger the test execution. The data mapping logic may correspond to the described logic at the data mapping component 135 implemented at the upgrade testing module 120, FIG. 1. Based on the data mapping logic, for a function from the list (as defined at 510) a corresponding test script from the scripts (as defined at 520) is defined. For one function, more than one test scripts may be determined.

At 540, the data mapping logic is executed so that relevant data from the application data for the test scripts executions are determined.

At 550, it is determined whether the relevant data for the test executions was found. If there is no relevant data found at a given iteration, the process 500 is directed to 530, where a test script is evaluated at a next iteration and proceeds as described before.

When the relevant test data is determined, at 560 an execution of a test script (iteratively selected at 530) is triggered. The test execution may be triggered at a test automation tool, such as the described test automation system 140, FIG. 1. At 560, the test automation tool may be configured to define a test variant in relation to a test script. The test automation tool may be configured to execute the test variant and collect test results, which may be analyzed.

At 570, it is determined whether there are more test scripts, as defined in the list at 520, which are yet to be iterated at 530. If there are more test scripts, the process is navigated to 530. If the test scripts from the list (as defined at 520) are iterated through 530, 540, 550, 560, 570, then at 580, results from executed test variants are provided.

At 590, the test results are analyzed and a notification to relevant stake holders of the application under testing may be provided.

In one embodiment, performing testing over cloud applications defined in customer accounts, where testing is performed over functionality of the cloud application and are executed over customer data associated with the cloud application may provide added value to provided maintenance services by software providers. Such test execution is associated with providing higher quality solutions as defects and issues in cloud applications may be encountered reliably and upgrades may be provided to application customers, where upgrades are tested within customer scenarios associated with specific customer configurations and customizations.

In such manner, continuous testing after every upgrade may be sustained and testing efficiently in shorter release cycles may be achieved. It may be possible to display the test results of the customer upgrade test conducted by software provider through the use of the test automation tool. In case of any failure, the test plan that is executed may be restarted directly from test automation tool.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 6:
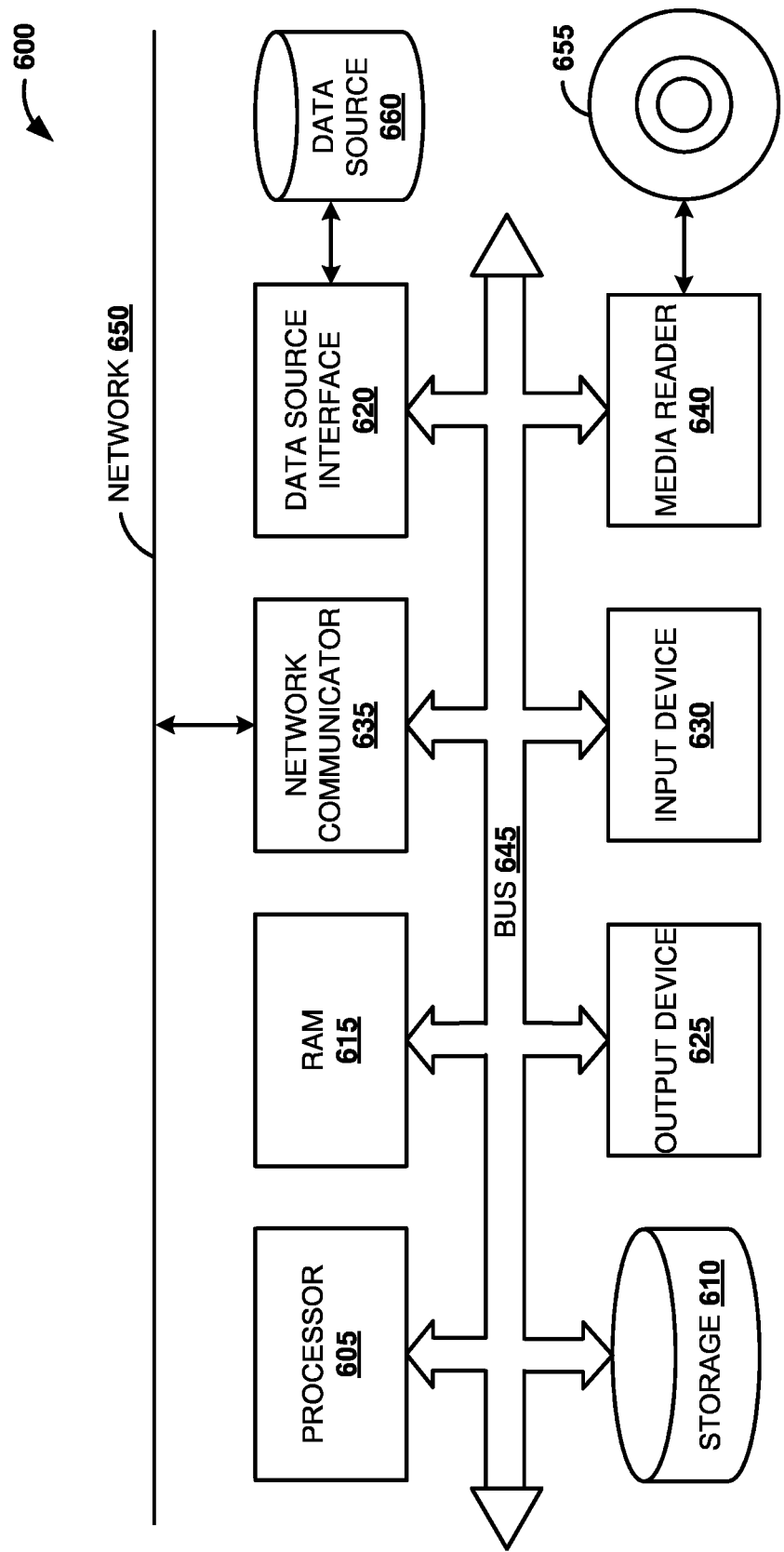
FIG. 6 is a block diagram illustrating an embodiment of a computing environment in which the techniques described for custom upgrade testing can be implemented.

FIG. 6 is a block diagram of an exemplary computer system 600. The computer system 600 includes a processor 605 that executes software instructions or code stored on a computer readable storage medium 655 to perform the above-illustrated methods. The processor 605 can include a plurality of cores. The computer system 600 includes a media reader 640 to read the instructions from the computer readable storage medium 655 and store the instructions in storage 610 or in random access memory (RAM) 615. The storage 610 provides a large space for keeping static data where at least some instructions could be stored for later execution. According to some embodiments, such as some in-memory computing system embodiments, the RAM 615 can have sufficient storage capacity to store much of the data required for processing in the RAM 615 instead of in the storage 610. In some embodiments, all of the data required for processing may be stored in the RAM 615. The stored instructions may be further compiled to generate other representations of the instructions and dynamically stored in the RAM 615. The processor 605 reads instructions from the RAM 615 and performs actions as instructed. According to one embodiment, the computer system 600 further includes an output device 625 (e.g., a display) to provide at least some of the results of the execution as output including, but not limited to, visual information to users and an input device 630 to provide a user or another device with means for entering data and/or otherwise interact with the computer system 600. Each of these output devices 625 and input devices 630 could be joined by one or more additional peripherals to further expand the capabilities of the computer system 600. A network communicator 635 may be provided to connect the computer system 600 to a network 650 and in turn to other devices connected to the network 650 including other clients, servers, data stores, and interfaces, for instance. The modules of the computer system 600 are interconnected via a bus 645. Computer system 600 includes a data source interface 620 to access data source 660. The data source 660 can be accessed via one or more abstraction layers implemented in hardware or software. For example, the data source 660 may be accessed by network 650. In some embodiments, the data source 660 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope of the one or more embodiments, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method to execute tests on upgraded applications in a cloud environment, the method comprising:
   selecting a test script from a set of test scripts for testing an execution process associated with an upgraded version of the cloud application, wherein the test script defines an order of actions to be executed on the upgraded version of the cloud application when running at a test infrastructure landscape;
   determining, at the test infrastructure landscape, data associated with the upgraded version of the cloud application, wherein the data include master data, transactional data, and organizational data, and wherein the data is productive data generated during an execution of a previous version of the cloud application, and wherein the master data include customer configuration parameters defined for the upgraded version of the cloud application;
   establishing mapping relationships between the actions defined at the test script and fields from the data;
   based on the established mapping relationships, generating a test variant to be executed on the upgraded version of the cloud application at the test infrastructure landscape, wherein the test variant includes mappings of types of the actions, application labels of the actions, and corresponding values from the fields associated with the mapping relationships, wherein the corresponding values from the fields comprise interrelated master data, transactional data, and organizational data invoked from the determined data according to the mapping relationships, wherein the values are inputted to the upgraded version of the cloud application that is configured with a custom configuration according to the custom configuration parameters when performing the actions for testing the execution process at the upgraded version of the cloud application; and executing the test variant on the upgraded version of the cloud application at the test infrastructure landscape to generate test results.

2. The method of claim 1, further comprising:

generating a list of execution processes associated with a set of software applications to be tested in the cloud environment.

3. The method of claim 2, further comprising:

defining the set of test scripts relevant for the execution process, wherein the list of execution processes comprises the execution process.

4. The method of claim 2, further comprising:

evaluating the list of execution processes to determine an association between a process relevant for the upgrade version of the cloud application and one or more scripts for performing upgrade testing for the upgrade version of the cloud application.

5. The method of claim 1, further comprises:

automatically triggering a task list in the test infrastructure landscape, the task list comprising one or more executable processes associated with the upgraded version of the cloud application, wherein the upgraded version of the cloud application is associated with an applied upgrade functionality and with corresponding custom configurations.

6. The method of claim 1, further comprising:

reading the data associated with the upgraded version of the cloud application, wherein the data includes configuration data for the custom configuration defined for the upgrade version of the cloud application in the test infrastructure landscape.

7. The method of claim 1, wherein establishing the mapping relationships comprises:

determining a first part of the data to be associated with a first action from the test script, wherein the first action is a user interaction defining an operation to be performed with a user interface element defined at a user interface of the upgraded version of the cloud application; and mapping the first action from the test script with a data field defined at a database associated with the first part of the data, wherein when the test variant is executed, a data value of the data field is inputted to the user interface element as part of a first action execution.

8. The method of claim 1, further comprising:

evaluating the test results generated based on the execution of the test variant.

9. A computer system to execute tests on upgraded applications in a cloud environment, comprising:

a processor; and a memory in association with the processor storing instructions related to:

select a test script from a set of test scripts for testing an execution process associated with an upgraded version of the cloud application, wherein the test script defines an order of actions to be executed on the upgraded version of the cloud application when running at a test infrastructure landscape;

determine, at the test infrastructure landscape, data associated with the upgraded version of the cloud application, wherein the data include master data, transactional data, and organizational data, and wherein the data is productive data generated during an execution of a previous version of the cloud application, and wherein the master data include customer configuration parameters defined for the upgraded version of the cloud application;

establish mapping relationships between the actions defined at the test script and fields from the data;

based on the established mapping relationships, generate a test variant to be executed on the upgraded version of the cloud application at the test infrastructure landscape, wherein the test variant includes mappings of types of the actions, application labels of the actions, and corresponding values from the fields associated with the mapping relationships, wherein the corresponding values from the fields comprise interrelated master data, transactional data, and organizational data invoked from the determined data according to the mapping relationships, wherein the values are inputted to the upgraded version of the cloud application that is configured with a custom configuration according to the custom configuration parameters when performing the actions for testing the execution process at the upgraded version of the cloud application; and execute the test variant on the upgraded version of the cloud application at the test infrastructure landscape to generate test results.

10. The system of claim 9, further comprises instructions to:

generate a list of execution processes associated with a set of software applications to be tested in the cloud environment; and define the set of test scripts relevant for the execution process, wherein the list of execution processes comprises the execution process.

11. The system of claim 10, further comprising instructions to:

evaluate the list of execution processes to determine an association between a process relevant for the upgrade version of the cloud application and one or more scripts for performing upgrade testing for the upgrade version of the cloud application.

12. The system of claim 10, further comprising instructions to:

reading the data associated with the upgraded version of the cloud application, wherein the data includes configuration data for the custom configuration defined for the upgrade version of the cloud application in the test infrastructure landscape.

13. The system of claim 9, wherein the instructions to establish the mapping relationships comprises instructions related to:

determine a first part of the data to be associated with a first action from the test script, wherein the first action is a user interaction defining an operation to be performed with a user interface element defined at a user interface of the upgraded version of the cloud application; and map the first action from the test script with a data field defined at a database associated with the first part of the data, wherein when the test variant is executed, a data value of the data field is inputted to the user interface element as part of a first action execution.

14. The system of claim 9, further comprising instructions to:

evaluate the test results generated based on the execution of the test variant.

15. A non-transitory computer-readable medium storing instructions, which when executed cause a computer system to:

select a test script from a set of test scripts for testing an execution process associated with an upgraded version of the cloud application, wherein the test script defines an order of actions to be executed on the upgraded version of the cloud application when running at a test infrastructure landscape;

determine, at the test infrastructure landscape, data associated with the upgraded version of the cloud application, wherein the data include master data, transactional data, and organizational data, and wherein the data is productive data generated during an execution of a previous version of the cloud application, and wherein the master data include customer configuration parameters defined for the upgraded version of the cloud application;

establish mapping relationships between the actions defined at the test script and fields from the data;

based on the established mapping relationships, generate a test variant to be executed on the upgraded version of the cloud application at the test infrastructure landscape, wherein the test variant includes mappings of types of the actions, application labels of the actions, and corresponding values from the fields associated with the mapping relationships, wherein the corresponding values from the fields comprise interrelated master data, transactional data, and organizational data invoked from the determined data according to the mapping relationships, wherein the values are inputted to the upgraded version of the cloud application that is configured with a custom configuration according to the custom configuration parameters when performing the actions for testing the execution process at the upgraded version of the cloud application; and execute the test variant on the upgraded version of the cloud application at the test infrastructure landscape to generate test results.

16. The computer-readable medium of claim 15, further comprises instructions to:

generate a list of execution processes associated with a set of software applications to be tested in a cloud environment; and define the set of test scripts relevant for the execution process, wherein the list of execution processes comprises the execution process.

17. The computer-readable medium of claim 16, further storing instructions to:

evaluate the list of execution processes to determine an association between a process relevant for the upgrade version of the cloud application and one or more scripts from the set of test scripts for performing upgrade testing for the upgrade version of the cloud application.

18. The computer-readable medium of claim 15, further storing instructions to:

read the data associated with the upgraded version of the cloud application, wherein the data includes configuration data for the custom configuration defined for the upgrade version of the cloud application in the test infrastructure landscape.

19. The computer-readable medium of claim 15, wherein the instructions to establish the mapping relationships further storing instructions to:

determine a first part of the data to be associated with a first action from the test script, wherein the first action is a user interaction defining an operation to be performed with a user interface element defined at a user interface of the upgraded version of the cloud application; and map the first action from the test script with a data field defined at a database associated with the first part of the data, wherein when the test variant is executed, a data value of the data field is inputted to the user interface element as part of a first action execution.

20. The computer-readable medium of claim 15, further storing instructions to:

evaluate the test results generated based on the execution of the test variant.

* * * * *